United States Patent [19]
Zaretsky

[11] Patent Number: 6,160,692
[45] Date of Patent: Dec. 12, 2000

[54] MICROPROCESSOR DETECTION OF TRANSIENT VOLTAGE AND ABNORMAL LINE VOLTAGE

[75] Inventor: Albert Zaretsky, Boynton Beach, Fla.

[73] Assignee: Leviton Manufacturing Co., Inc., Little Neck, N.Y.

[21] Appl. No.: 09/287,695

[22] Filed: Apr. 6, 1999

[51] Int. Cl.[7] ...................................................... H02H 3/18
[52] U.S. Cl. ............................ 361/86; 361/111; 361/118; 361/124; 361/127; 361/131
[58] Field of Search ........................... 361/56, 78, 85–86, 361/91.1, 103, 111, 117–118, 124–126, 127, 131

[56] References Cited

U.S. PATENT DOCUMENTS 5,321,575  6/1994  Shilo .......................................... 361/56
5,646,810  7/1997  Funke ........................................ 361/56

*Primary Examiner*—Michael J. Sherry
*Attorney, Agent, or Firm*—Paul J. Sutton

[57] ABSTRACT

A method for determining the extent of a transient's ability to cause MOV over heating and subsequent explosion by microprocessor analysis of an AC voltage input waveform with respect to a stored perfect sine wave. The microprocessor also calculates the RMS value of the applied voltage waveform and compares it to stored limits to determine if it could cause over heating of the MOV. In either case, the microprocessor will generate an out-of-range signal to a disconnect device to take the MOV, and also the load, if desired, off line until normal line voltage is restored.

31 Claims, 3 Drawing Sheets

_US 6,160,692_

MICROPROCESSOR DETECTION OF TRANSIENT VOLTAGE AND ABNORMAL LINE VOLTAGE

BACKGROUND OF THE INVENTION

1. Field of the Invention

The invention is directed to the field of transient voltage surge suppression (TVSS) devices and more particularly to the protection of metal oxide varistors (MOV) used in such devices.

2. Description of the Prior Act

MOVs are commonly used as the transient suppression element of TVSS devices. Although they are capable of clamping large narrow voltage spikes by diverting transient currents, they generally are characterized by very low energy (watt-second) absorption capability. When their energy rating is exceeded they tend to explode in a violent fashion propelling metal fragments in all directions producing possible injury to persons and equipment nearby.

A conventional way of preventing this is to put a current rated fuse in series with the MOV. The fuse preferably is rated so that it will blow before the MOV energy rating is exceeded. Another approach utilizes a thermal fuse in direct thermal contact with a face of the MOV and is chosen such that it will be blow before the temperature rating of the MOV is exceeded.

In both of these cases the explosion of the MOV is prevented but the blowing of either type of fuse removes the transient suppression ability for the protected circuit because of the absence of the MOVs.

SUMMARY OF THE INVENTION

The instant invention overcomes the problem noted above with respect to prior art devices by providing a device and a technique by which the MOV is removed from the circuit under certain conditions and is returned to the circuit once these conditions no longer exist.

The extent of the transient voltage and whether it might cause MOV over heating is determined by microprocessor analysis of the AC input waveform. In addition, the microprocessor also calculates the root mean square (RMS) value of the applied voltage in order to determine if it might cause MOV overheating. In either case, the microprocessor will generate an out-of-range signal. This signal will be applied to a disconnect device, such as a solenoid operated relay, to operate the relay to disconnect the circuitry and the load, if desired, from the input voltage source. The microprocessor due to its extremely low current may utilize a large resistor and a zener diode to protect it and thus the microprocessor continues to monitor the input voltage and once normal line voltage is restored, the relay will be allowed to close its contacts to place the MOV circuitry and load, if also disconnected, back in circuit with the input voltage source.

An analog to digital converter is utilized to sample the input line voltage for inputting to the microprocessor. The microprocessor analyzes input voltage levels as to their amplitude, their relationship to the previous input, such as too large or too small an increment percentage-wise, as compared to a perfect sine wave stored in the microprocessor memory. The microprocessor also calculates the RMS of the applied voltage. Limits are also stored in the microprocessor memory and relate to the particular surge suppressor or MOV being used. They can include their thermal time constant, maximum allowable temperature, thermal resistance etc. When a limit is reached the out-of-range signal, as set forth above, is generated. It is an object of the instant invention to provide protection for an MOV surge suppressor.

It is an object of the instant invention to provide protection for an MOV surge suppressor which removes the MOV from the input voltage source when certain conditions exist.

It is another object of the instant invention to provide protection for an MOV surge suppressor by removing it from the input voltage source when the input voltage source waveform exceeds a stored perfect waveform or the RMS value of the input voltage exceeds certain limits.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWING

In the drawings in which similar elements are given similar reference characters.

DESCRIPTION OF THE PREFERRED EMBODIMENT

Figure 1:
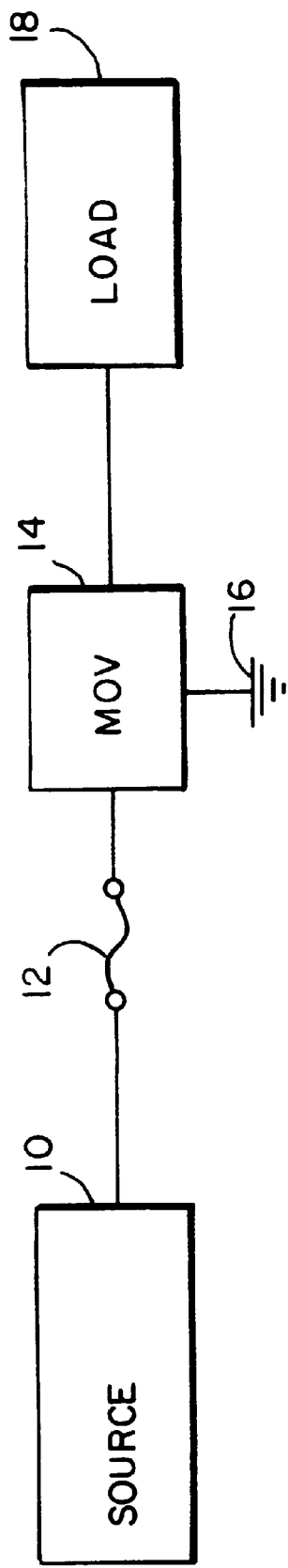
FIG. 1 is a schematic diagram of one form of protection for an MOV surge suppressor element according to the prior art.

Turning now to FIG. 1 according to one circuit of the prior art a source 10 of input voltage is connected to a fuse 12 which in turn is connected to MOV 14 coupled to ground as at 16. The MOV 14 is also connected to electrical load 18. The fuse 12 is selected based upon its current characteristics ($I^2T$), so that it will blow prior to the MOV exceeding the thermal time constant value. To reestablish the path between source 10, MOV 14 and electrical load 18, the fuse 12 must be replaced.

Figure 2:
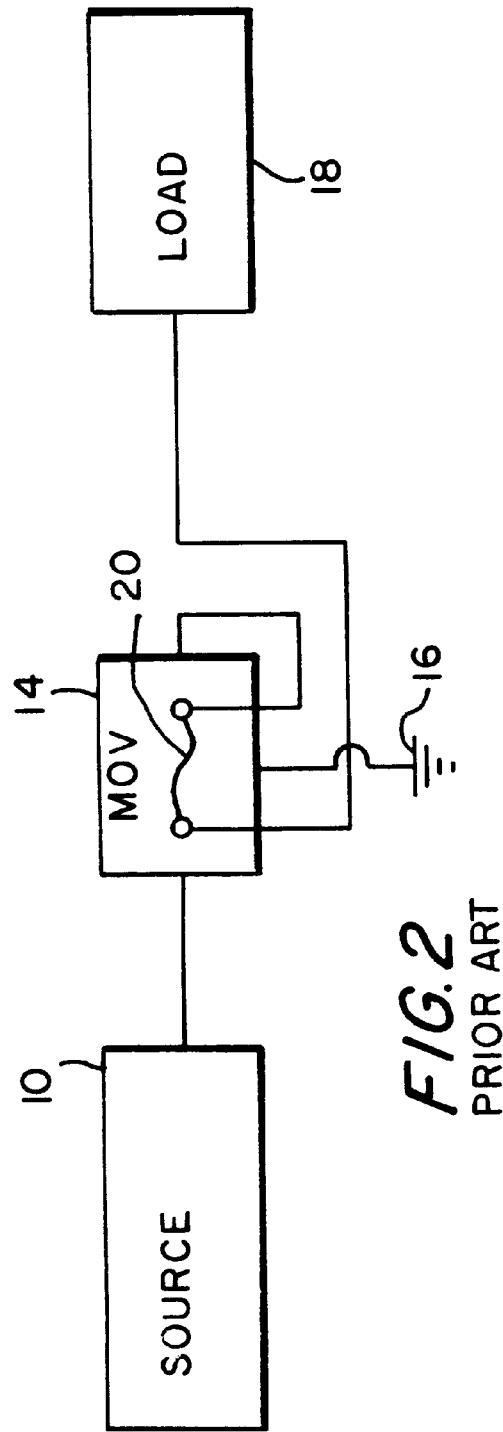
FIG. 2 is a schematic diagram of a second form of protection for an MOV surge suppressor element according to the prior art.

FIG. 2 shows another prior art technique for protecting a MOV surge suppressor element 14. A thermal fuse 20 is connected in series with MOV 14 and load 18. The thermal fuse 20 is placed on or close to a surface of the MOV 14 so that it can respond to the surface temperature of MOV 14. The thermal fuse 20 characteristics are so chosen that the fuse will melt and open the circuit between source 10 and electrical load 18 before the temperature of MOV 14 gets high enough to explode. In order to supply power to the electrical load 18, the thermal fuse 20 must be replaced as was true of the fuse 12 of the system of FIG. 1.

Figure 3:
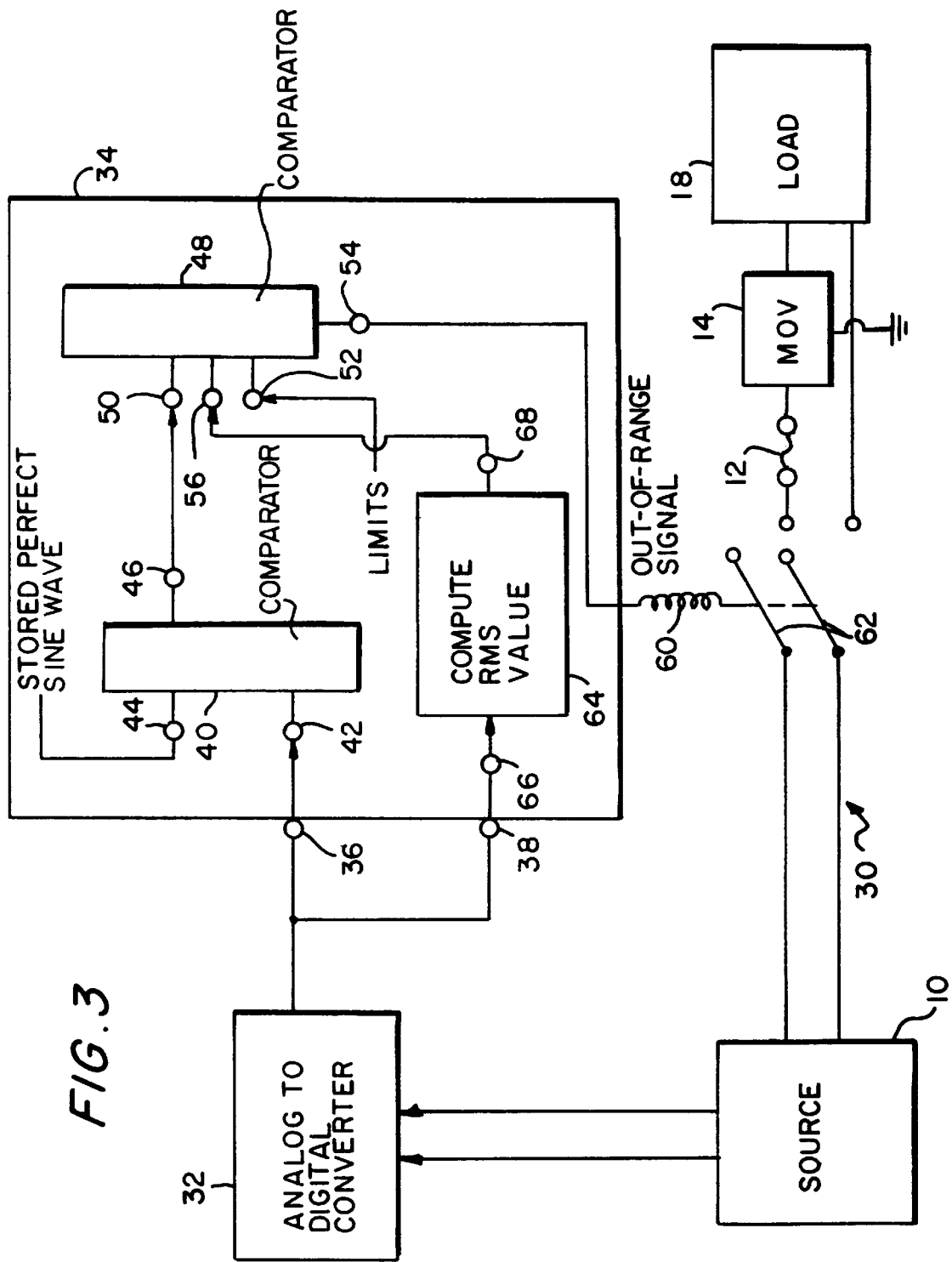
FIG. 3 is a schematic diagram of a device constructed in accordance with the concepts of the invention and in which the load is disconnected from the power source along with the MOV circuitry.

Referring now to FIG. 3 there is shown a system 30 for providing protection for a MOV 14 which can remove MOV 14 from the circuit from the source 10 to the electrical load 18 when certain conditions are present and restore the circuit between the source 10 and the electrical load 18 once those certain conditions are no longer present. Source 10 is connected to an analog to digital converter 32 which samples the input line voltage wave form, converts it to digital form and inputs that data to a first input terminal 36 and a second input terminal 38 of microprocessor 34. Input terminal 36 is coupled to input terminal 42 of a comparator 40 which also receives the digital data corresponding to a perfect sine wave stored in the microprocessor 34 at input terminal 44. In the event that the input wave form applied to input terminal 42 exceeds the perfect sine wave signal on input terminal 44, an output signal appears on output terminal 46 indicative of the difference between the signals on input terminals 42 and 44. This difference signal is applied to an input terminal 50 of a second comparator 48 which also receives a limit signal on input terminal 52 indicative of the maximum permitted difference between the value of the perfect sine wave and the input voltage wave form. If the difference exceeds this limit value an out-of-range signal is applied to output terminal 54. This out-of-range signal is applied to the solenoid 60 of a relay to open the contacts 62 which connect the source 10 to the fuse 12, MOV 14 and load 18 and remove power to these components.

In addition to comparing the input voltage wave form to the stored perfect sine wave, the microprocessor also computes the RMS value of the input signal and compares this to certain limiting values stored in the microprocessor 34. The input terminal 38 is coupled to (input terminal 66 of a calculator 64 in microprocessor 34 to calculate the RMS value of the signal applied from the analog to digital converter 32. The RMS value is applied to output terminal 68 which is connected to input terminal 56 of comparator 48. Certain limits are stored in the memory of the microprocessor 34 for comparison with the RMS value. These limits relate to the particular MOV used in the system 30 and include their thermal time constant, maximum allowable temperature, thermal resistance. The $I^2T$ value of the fuse 12 is also stored as a limit so that the system 30 can respond before fuse 12 blows which is before the MOV is affected. The limit signals are applied to input terminal 52 of comparator 48. In the event the RMS value on input terminal 56 exceeds the limit signal in input terminal 52 an of out-of-range signal is present on output terminal 54 and applied to solenoid 60 to open the contacts 62 and separate fuse 12, MOV 14 and load 18 from the source 10.

The microprocessor 34 itself is protected from transient voltages. The minute current required by the microprocessor 34 circuit facilitates a high ohmic value for a protective resistor, thus dissipating surge energy to the microprocessor 34. Thus, the microprocessor 34 can continuously monitor the input voltage wave form and remove the out-of-range signal from output terminal 54 when the input voltage wave form returns to normal limits.

Figure 4:
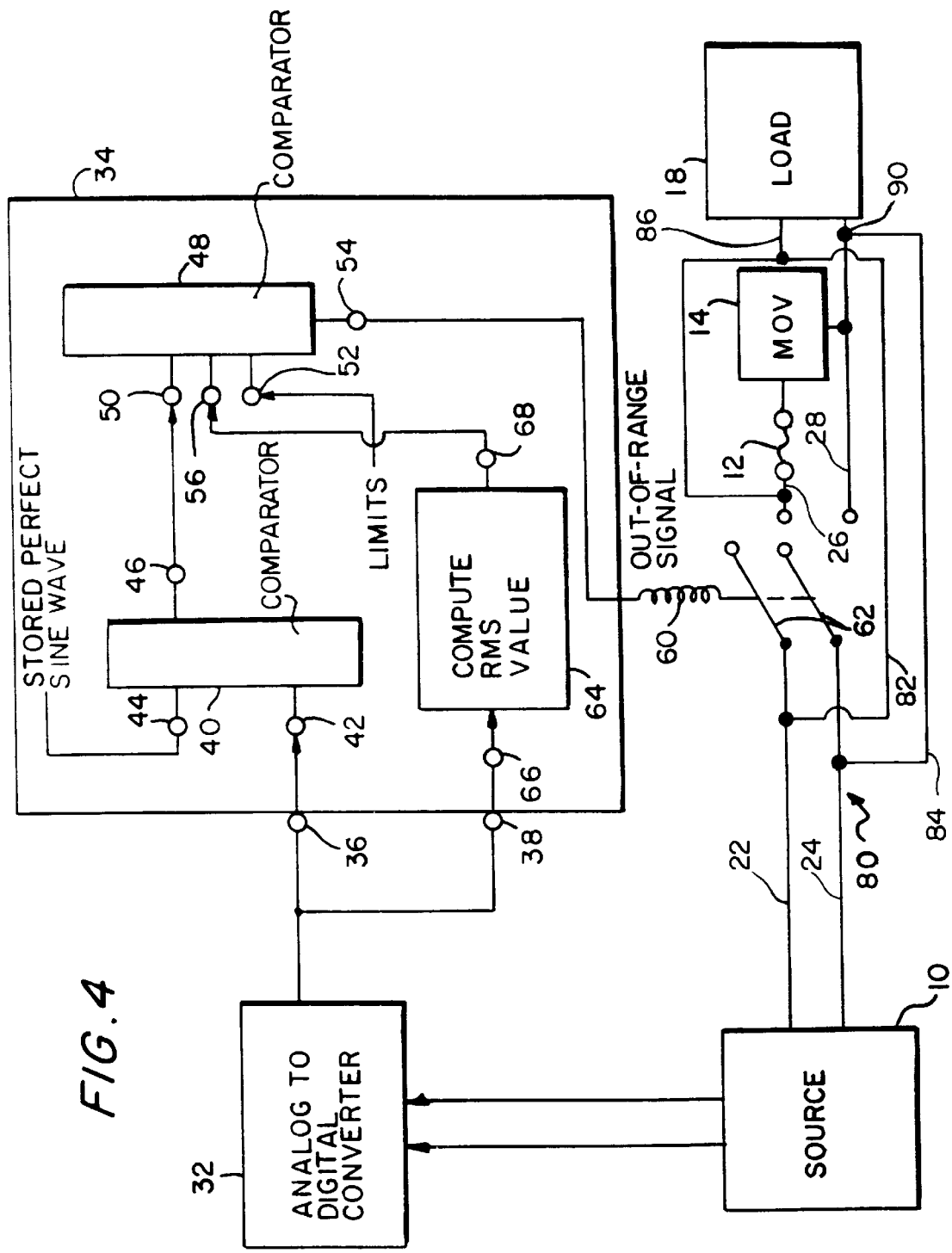
FIG. 4 is a schematic diagram of a device constructed in accordance with the concepts of the invention, and in which the load stays connected to the power source while the MOV circuitry is disconnected.

FIG. 4 shows a modified system with the parallel connection of the load 18 and the MOV 14 circuitry to a source 10, such that the operation of the MOV 14 circuit does not interrupt power to the load 18. This arrangement is useful when the load is of the type that shut down is not permitted, such as with hospital equipment, etc. Phase line 22 is connected to load 18 via a line 82 and a further line 86. The line 82 is connected to an input line 26 to the fuse 12. Neutral line 24 is connected via a line 84 to neutral input line 28 at junction 90. In this manner, the load 18 and the MOV 14 circuitry are connected in parallel with respect to source 10. The opening of the MOV 14 circuitry will not remove power from the load 18.

While there have been shown and described and pointed out the fundamental novel features of the invention as applied to the preferred embodiment, as is presently contemplated for carrying them out, it will be understood that various omissions and substitutions and changes of the form and details of the device illustrated and in its operation may be made by those skilled in the art, without departing from the spirit of the invention.

I claim:

1. Method of protecting a metal oxide varistor (MOV) from damage comprising the steps of:
   a) placing said MOV in series with a solenoid operated switch having a first position to conduct current through said MOV to an electrical load and a second position to prevent the conducting of current through said MOV to said electrical load;
   b) providing a source of voltage connected to said solenoid operated switch;
   c) comparing a waveform of said source of voltage to a stored value of a perfect voltage waveform; and
   d) operating said solenoid operated switch to said second position if the waveform of said source of voltage exceeds a predetermined limit.

2. The method, as defined in claim 1, further comprising:
   a) computing the root mean square (RMS) value of a waveform of said source of voltage; and
   b) operating said solenoid operated switch to said second position if the RMS value of the waveform of said source of voltage exceeds a predetermined limit.

3. The method, as defined in claim 1, wherein said predetermined limit is a value of amplitude the waveform of said source of voltage may not exceed.

4. The method, as defined in claim 1, wherein said predetermined limit is a value by which the waveform of said source of voltage may not exceed a stored perfect voltage waveform.

5. The method, as defined in claim 1, wherein said predetermined limit is set by the characteristics of said MOV.

6. The method, as defined in claim 5, wherein said predetermined limit is the thermal time constant of said MOV.

7. The method, as defined in claim 5, wherein said predetermined limit is the maximum allowable temperature of said MOV.

8. The method, as defined in claim 5, wherein said predetermined limit is the thermal resistance of said MOV.

9. The method, as defined in claim 2, wherein said predetermined limit is set by the characteristics of said MOV.

10. The method, as defined in claim 9, wherein said predetermined limit is the thermal time constant of said MOV.

11. The method, as defined in claim 9, wherein said predetermined limit is the maximum allowable temperature of said MOV.

12. The method, as defined in claim 9, wherein said predetermined limit is the thermal resistance of said MOV.

13. An apparatus for opening a circuit between a source of AC power and an electrical load to protect an MOV in parallel with said electrical load comprising:
   a) a source of AC power;
   b) an analog to digital converter coupled to said source of AC power to sample an input line voltage of said source of AC power;
   c) a first storage device for storing a perfect sine wave; and
   d) a first comparing device coupled to said first storage device and said analog to digital converter for comparing the waveform of the sampled input line voltage with said perfect sine wave and providing a first signal indicative of any differences between said input line voltage waveform and said perfect sine wave.

14. An apparatus as defined in claim 13, further comprising:
   a) second storage device for storing limits for said first signal;
   b) a second comparing device coupled to said fist comparing means and said second storage device for comparing said first signal to said limits and producing a second signal in the event said first signal exceeds said limits; and
   c) electrical switch means coupled between said source of a AC power and a MOV and electrical load in parallel and to said second comparing device to switch said electrical switch means to an open position removing AC power from said MOV and said electrical load in response to said second signal.

15. An apparatus, as defined in claim 14, further comprising:
   a) computer means coupled to said analog to digital converter to compute the root mean square (RMS) value of the sampled input line voltage and produce a third signal indicative of the RMS value, said computer means coupled to said second comparing device; and
   b) said second comparing means produces said second signal in the event that said third signal exceeds said limits.

16. An apparatus, as defined in claim 14, wherein said limits are the thermal time constants of said MOV.

17. An apparatus, as defined in claim 14, wherein said limits are the maximum allowable temperatures of said MOV.

18. An apparatus, as defined in claim 14, wherein said limits are the thermal resistance of said MOV.

19. An apparatus, as defined in claim 14, wherein said second comparing devices continues to compare said first signal and said limits and said third signal and said limits and terminates the generation of said second signal when both said first signal and said third signal are below said limits to permit said electrical switch means to close and restore AC power to said MOV and electrical load.

20. Method of protecting a MOV from damage comprising the steps of:
   a) placing said MOV in series with a solenoid operated switch having a first position to conduct current through said MOV and a second position to prevent the conducting of current through said MOV;
   b) providing a source of voltage connected by a first path to said solenoid operated switch;
   c) coupling an electrical load to said source of voltage by a second path in parallel with said MOV;
   d) comparing a waveform of said source of voltage to a stored value of a perfect waveform; and
   e) operating said solenoid operated switch to said second position if the waveform of said source of voltage exceeds a predetermined limit to open said first path to said MOV while leaving said second path to said load complete.

21. The method, as defined in claim 20, further comprising the steps of:
   a) computing the root mean square (RMS) value of a waveform of said source of voltage; and
   b) operating said solenoid operated switch to said second position if the RMS value of the waveform of said source of voltage exceeds a predetermined limit.

22. The method, as defined in claim 20, wherein said predetermined limit is a value of amplitude the waveform of said source of voltage may not exceed.

23. The method, as defined in claim 20, wherein said predetermined limit is a value by which the waveform of said source of voltage may not exceed a stored perfect voltage waveform.

24. The method, as defined in claim 20, wherein said predetermined limit is set by the characteristics of said MOV.

25. The method, as defined in claim 24, wherein said predetermined limit is the thermal time constant of said MOV.

26. The method, as defined in claim 24, wherein said predetermined limit is the maximum allowable temperature of said MOV.

27. The method, as defined in claim 24, wherein said predetermined limit is the thermal resistance of said MOV.

28. The method, as defined in claim 21, wherein said predetermined limit is set by the characteristics of said MOV.

29. The method, as defined in claim 28, wherein said predetermined limit is the thermal time constant of said MOV.

30. The method, as defined in claim 28, wherein said predetermined limit is the maximum allowable temperature of said MOV.

31. The method, as defined in claim 28, wherein said predetermined limit is the thermal resistance of said MOV.

* * * * *